United States Patent Office 3,113,838
Patented Dec. 10, 1963

3,113,838
PROCESS FOR ENRICHING OF PHOSPHORIC ANHYDRIDE PHOSPHATE MINERALS CONTAINING CALCIUM CARBONATE
Giovanni Perri and Giuseppe Tubiello, Novara, Italy, assignors to Montecatini Società Generale per l'Industria Mineraria e Chimica, Milan, Italy
No Drawing. Filed July 6, 1959, Ser. No. 824,911
Claims priority, application Italy July 8, 1958
10 Claims. (Cl. 23—165)

Our invention relates to a process for enriching, by flotation, of $P_2O_5$ phosphate minerals containing substantial amounts of calcium carbonate, and more particularly to a flotation process for separating calcium carbonate from such minerals in a flotation solution containing soluble alkaline phosphates.

In general, $P_2O_5$ phosphate rocks containing calcium carbonate are not employed for the preparation of superphosphates because they have a low $P_2O_5$ content and consume considerable amounts of sulphuric acid.

The enrichment of said phosphate minerals by removing calcium carbonate has been the object of numerous studies and tests which, however, did not heretofore make it possible to obtain adequate results of a practical or commercial interest.

We have now found that calcium carbonate contained in the phosphate rocks can be separated out by flotation of said minerals with the aid of common anionic reactants, e.g. fatty acids, provided that the flotation is carried out in the presence of soluble alkaline phosphates.

It is therefore an object of our invention to provide a method for enriching phosphate minerals containing calcium carbonate so as to make them economically practical as a source of phosphoric anhydride.

It is another object of the invention to provide a method for separating out calcium carbonate from $P_2O_5$ phosphate minerals by a simple flotation process without requiring excessive amounts of sulphuric or other acid to dissolve out the calcium carbonate.

Other objects and many of the attendant advantages of this invention will be readily appreciated as the same becomes better understood by reference to the following detailed description and examples.

According to the process of the present invention the phosphate minerals are first ground to such a fineness that the calcium phosphate granules are separated from the calcium carbonate granules; to obtain this, it is in general necessary to grind the mineral until particles with size lower than 0.2 mm. are obtained. This grinding can be carried out either in dry or wet condition.

In the first embodiment of the invention, the ground mineral is suspended in an aqueous solution of a soluble alkaline phosphate and then subjected to flotation. In the second embodiment the grinding is carried out directly in the aforementioned solution. The best pH value of the suspension during the flotation is that between 6 and 7; this can be easily realized by addition of an acid or an alkali.

In a commercial operation, for better economy of the process, the solutions are recycled so that the losses occurring during the process are thus re-integrated.

The aforementioned aqueous phosphate solutions can be regularly prepared by dissolving the phosphate salts or attacking a portion of the phosphate rock with a mineral acid such as sulphuric acid until phosphoric acid is freed so that the calcium phosphate is transformed into a soluble phosphate.

The acidity of said aqueous phosphate solution is then adjusted to the desired pH value and the solution is introduced into the grinding or flotation cycle.

In the flotation operation most of calcium carbonate passes into the foams while calcium phosphate and the not-floated impurities remain in the residue.

The process is generally carried out at room temperature but some tests have demonstrated that it can be also carried out at higher temperatures with the same results.

We have also found that satisfactory results are obtained even when sea water is used instead of ordinary water, but here again the process is conducted in the presence of soluble alkaline phosphates.

As illustrative of the processes contemplated by the instant invention, the following typical examples are disclosed, the percentages shown being by weight.

EXAMPLE 1

A phosphate rock containing 20% $P_2O_5$ and 35% calcium carbonate is ground until it passes completely through a sieve provided with 0.2 mm. mesh, and is then suspended in a 1% sodium phosphate aqueous solution in order to obtain a turbid solution containing 25% solids.

The pH is adjusted to 6–7 by the addition of an acid or an alkali and 250 gr. oleic acid (per ton of treated mineral) are added to the turbid solution.

After flotation, carried out by a conventional method known per se, from 100 parts by weight of starting mineral, in the foams about 45 parts (by weight) are obtained which contain 77.6% $CaCO_3$ and 2% $P_2O_5$, and in the residue about 55 parts are left which contain 34% $P_2O_5$ and 7% $CaCO_3$.

EXAMPLE 2

Tests carried out exactly as in Example 1 but replacing sodium phosphate each time with a different phosphate, gave the results reported in Table I.

Table I

| Alkaline phosphate used | Composition of the floated portion | | Composition of the residue | |
|---|---|---|---|---|
| | $P_2O_5$, percent | $CaCO_3$, percent | $P_2O_5$, percent | $CaCO_3$, percent |
| Potassium monophosphate | 2.5 | 77.0 | 33.5 | 8 |
| Ammonium monophosphate | 3.5 | 73.5 | 34.5 | 7 |
| Disodium pyrophosphate | 2.3 | 76.5 | 34.5 | 6.5 |

EXAMPLE 3

Some tests carried out exactly as in Example 1, but using as anionic compound the sodium salt of stearic and palmitic acids, gave the results reported in Table II.

Table II

| Anionic compound | Composition of the floated portion | | Composition of the residue | |
|---|---|---|---|---|
| | $P_2O_5$, percent | $CaCO_3$, percent | $P_2O_5$, percent | $CaCO_3$, percent |
| Sodium stearate | 2.5 | 77.0 | 34.0 | 7.0 |
| Sodium palmitate | 2.3 | 77.2 | 33.8 | 7.4 |

EXAMPLE 4

In a test carried out as in Example 1 but using, instead of water, as a liquid for the turbid suspension, a salt solution at room temperature containing 30 g./l. NaCl, 3.5 g./l. $MgCl_2$, 3 g./l. $MgSO_4$, 1 g./l. KCl and 10 g./l. $P_2O_5$, the following results were obtained:

Floated portion contained: 3% $P_2O_5$ and 74.5% $CaCO_3$
Residue contained: 34.5% $P_2O_5$ and 7% $CaCO_3$

EXAMPLE 4A

Practically the same results as in Example 4 were obtained by operating with a turbid solution at 60° C., instead of at room temperature.

EXAMPLE 5

For comparison purposes, in order to illustrate the need for carrying out the flotation in the presence of soluble alkaline phosphates, tests were carried out under the conditions of the preceding examples but in absence of the aforementioned soluble alkaline phosphates, with the following results:

Floated portion contained: 18% $P_2O_5$ and 45% $CaCO_3$
Residue contained: 22% $P_2O_5$ and 30% $CaCO_3$ The term "phosphate" is employed generically, and includes pyrophosphates.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention as set forth in the appended claims.

We claim:
1. A process for beneficiating phosphate rock, containing calcium carbonate, by froth flotation, comprising grinding the rock to a fineness such that calcium phosphate granules are detached from calcium carbonate granules, suspending the finely ground rock in an aqueous solution of a soluble phosphate taken from the class consisting of sodium, potassium and ammonium phosphates, and adding an anionic floatation agent acting as collector for the calcium carbonate granules, subjecting the mixture to froth flotation, a major amount of the calcium carbonate being removed in the froth, the residue being thereby enriched in $P_2O_5$.

2. A process for beneficiating phosphate rock, containing calcium carbonate, by froth flotation, comprising grinding the rock to a fineness such that calcium phosphate granules are detached from calcium carbonate granules, suspending the finely ground rock in an aqueous solution of a soluble phosphate taken from the class consisting of sodium, potassium and ammonium phosphates, and adding an anionic flotation agent taken from the class consisting of the higher fatty acids and alkali metal salts thereof acting as collector for the calcium carbonate granules, subjecting the mixture to fresh flotation, a major amount of the calcium carbonate being removed in the froth, the residue being thereby enriched in $P_2O_5$.

3. A process for beneficiating phosphate rock, containing calcium carbonate, by froth flotation, comprising grinding the rock to a fineness such that calcium phosphate granules are detached from calcium carbonate granules, namely to a particle size lower than about 0.2 mm., suspending the finely ground rock in an aqueous solution of a soluble phosphate taken from the class consisting of sodium, potassium and ammonium phosphates, adjusting the pH to about 6 to 7, and adding an anionic flotation agent acting as collector for the calcium carbonate granules, subjecting the mixture to froth flotation, a major amount of the calcium carbonate being removed in the froth, the residue being thereby enriched in $P_2O_5$.

4. A process for beneficiating phosphate rock, containing calcium carbonate, by froth flotation, comprising grinding the rock to a fineness such that calcium phosphate granules are detached from calcium carbonate granules, namely to a particle size lower than about 0.2 mm., suspending the finely ground rock in an aqueous solution of a soluble phosphate taken from the class consisting of sodium, potassium and ammonium phosphates, adjusting the pH to about 6 to 7, and adding an anionic flotation agent taken from the class consisting of the higher fatty acids and alkali metal salts thereof acting as collector for the calcium carbonate granules, subjecting the mixture to froth flotation, a major amount of the calcium carbonate being removed in the froth, the residue being thereby enriched in $P_2O_5$.

5. A process for beneficiating by froth flotation a phosphate mineral comprising calcium phosphate and calcium carbonate, comprising grinding the mineral to a fineness such that calcium phosphate granules are detached from calcium carbonate granules, namely to a particle size lower than about 0.2 mm., suspending the finely ground rock in an aqueous solution of a soluble phosphate taken from the group consisting of sodium, potassium and ammonium phosphates, adjusting the pH to about 6 to 7 and adding an anionic flotation agent taken from the class consisting of the higher fatty acids and alkali metal salts thereof acting as collector for the calcium carbonate granules, and subjecting the mixture to froth flotation, a major amount of the calcium carbonate being removed in the froth, the residue being enriched in $P_2O_5$.

6. The process of claim 4, the phosphate rock being ground in water in the presence of said water-soluble phosphate.

7. The process of claim 4, the flotation being carried out in sea water.

8. The process of claim 4, the flotation agent being oleic acid.

9. The process of claim 4, the flotation agent being sodium stearate.

10. The process of claim 4, the flotation agent being sodium palmitate.

References Cited in the file of this patent

UNITED STATES PATENTS

| | | |
|---|---|---|
| 2,168,762 | Clemmer et al. | Aug. 8, 1939 |
| 2,312,466 | Erickson et al. | Mar. 2, 1943 |
| 2,507,012 | Heilmann | May 9, 1950 |
| 2,753,045 | Hollingsworth | July 3, 1956 |